United States Patent Office 3,268,337
Patented August 23, 1966

3,268,337
GRANULAR STARCH LAYER CAKE BATTER SYSTEM AND PROCESS FOR PRODUCING SAME
Norman B. Howard, Hamilton, and Donald H. Hughes and Rudolf G. K. Strobel, Cincinnati, Ohio, assignors to The Procter & Gamble Company, Cincinnati, Ohio, a corporation of Ohio
No Drawing. Filed Nov. 5, 1963, Ser. No. 321,410
21 Claims. (Cl. 99—92)

This invention relates to novel edible compositions of matter and, more particularly, to new and improved layer cake mixes, layer cake batter systems, and baked layer cakes which contain granular starch.

The soft wheats are considered to be the best source of flour for layer cakes primarily because of their low protein content. Cake flour derived from soft wheat is known to vary greatly in its ultimate behavior characteristics as a result of variations in soil and climatic conditions where the wheat is grown, the method of harvesting and handling the wheat and the conditions under which the wheat is milled. Since flour has been deemed to be an essential ingredient of all layer cakes, variations in baked layer cakes attributable to the variable performance characteristics of flour have been tolerated.

The volume, texture, and eating qualities of baked layer cakes are also dependent upon the interaction of various ingredients during the mixing operation in which an emulsion or cake batter is formed and the stabilization during subsequent baking and/or storage of the cake. Many attempts have been made to improve the emulsion characteristics of layer cake batter systems and layer cakes by incorporating therein small amounts of various edible additives which are able to improve the colloidal properties of the cake constituents. Although a number of the conventional additives such as lecithin and other phosphatides and the partial glycerides of higher fatty acids have been found to be useful emulsifiers in cake batter systems, they have not been able to achieve the desired air incorporation with concurrent foam stability during preparation and baking of the cake.

Howard, U.S. Patents 3,145,107, 3,145,108 and 3,145,109, issued August 18, 1964, discloses novel shortenings containing various added amounts of certain alpha-phase crystal-tending emulsifiers and high temperature batter stabilizers. The described shortenings show the unique property of providing acceptable cakes of high volume with "single-stage batter mixing" in which all the cake ingredients are simultaneously mixed together in the mixing container as distinguished from the conventional multi-stage "reaming" or "blending" methods ordinarily used in cake batter preparation.

In the co-pending application of Strobel, U.S. Serial Number 321,436, filed November 5, 1963, it is disclosed that the stability of cake batter systems containing certain of the alpha-phase crystal-tending emulsifiers and high temperature batter stabilizers described in the above-mentioned patents of Howard can be substantially improved by employing in the batter small amounts of certain non-toxic, water-soluble, polyvalent metal ion salts. In general, the improvements to cake batter systems described in the copending Strobel application are obtained by employing in a cake batter emulsion comprising shortening, flour, and sugar, from about 0.5% to about 16%, by weight of the shotening, of certain alpha-phase crystal-tending emulsifiers, from about 0.1% to about 8%, by weight of the shortening, of a high temperature batter stabilizer, and from about 0.001% to about 1.0%, by weight of the batter emulsion, of a non-toxic, water-soluble, polyvalent metal ion salt.

It has now been found that layer cakes can be produced with granular starch rather than flour when the layer cake also includes a shortening containing an alpha-phase crystal-tending emulsifier and a high temperature batter stabilizer; a non-toxic, water-soluble, polyvalent metal ion salt; and, a soluble foamable protein. Layer cakes prepared with these ingredients are improved in volume and grain over conventional flour-containing layer cakes.

The advantages attendant to the preparation of layer cakes with granular starch are abundant. The use of granular starch in place of conventional flour eliminates the hereinbefore described performance variations associated with cake flour. Granular starch-containing layer cakes exhibit excellent volume and grain which can be still further improved through the use of admixtures of granular starches such as rice and wheat starches. Eating quality of the granular starch-containing layer cakes can be controlled through the use of admixtures of granular starches as well as through the use of admixtures of granular starch with starch fractions such as amylose and amylopectin, other vegetable gums, cellulose derivatives and crystalline aggregate cellulose. When granular starches other than granular wheat starch are employed, the starch gelatinization temperature can be controlled by varying the sucrose concentration in the cake. A still further advantage of granular starch-containing layer cakes is that they can be readily eaten by people who suffer from allergenic responses to wheat gluten; for example, by victims of non-tropical sprue.

Accordingly, it is the principal object of this invention to provide layer cake mixes, layer cake batter systems, and baked layer cakes containing granular starch which are improved in volume and grain over flour-containing layer cakes.

It is another object of this invention to provide layer cake mixes, layer cake batter systems, and baked layer cakes containing mixtures of granular starches which have improved eating qualities and are improved in volume and grain over flour-containing layer cakes.

It is a further object of this invention to provide granular starch-containing layer cakes having improved eating qualities which also contain a starch fraction.

Other objects and advantages of this invention will be apparent from the following detailed description.

In general, the improvements to layer cake mixes and batter systems achieved with this invention are obtained by employing granular starch in a cake batter emulsion comprising in addition to starch, shortening and sugar, from about 0.5% to about 16.0%, by weight of shortening, of an alpha-phase crystal-tending emulsifier, from about 0.1% to about 8.0%, by weight of the shortening, of a high temperature batter stabilizer, from about 0.001% to about 1.0%, by weight of the batter emulsion, of a non-toxic, water-soluble, polyvalent metal ion salt, and from about 0.5% to about 8.0%, by weight of the batter emulsion, of a soluble foamable protein.

The granular starch employed in this invention is non-pregelatinized, non-ruptured starch derived from wheat, corn, potatoes, rice arrowroot, waxy rice, pineapple, sorghum, tapioca, amioca, barley, oats, rye and the like. Wheat starch is especially preferred because of its better performance characteristics. Starches derived from sources other than wheat can be used alone but are best used in admixture with wheat starch. Although native starches are preferred, commercially available starches which have been subjected to controlled water and controlled heat treatment during processing work equally as well.

In composing the layer cake mixes and batter systems of this invention, granular starch is completely substituted for flour. As will be more clearly described hereinafter, admixtures of granular starches, admixtures of granular starch and starch fractions and certain flour and starch admixtures can be employed to produce variations in the basic characteristics of the granular starch layer cakes.

The alpha-phase crystal-tending emulsifiers of this invention are both lipophilic and hydrophilic and contain in the molecule at least one higher fatty acid radical having from about 12 to about 22 carbon atoms and at least one free and unesterified hydroxyl group. Said emulsifiers are characterized by the tendency to crystallize in an alpha-phase rather than a beta- or beta-prime phase. These types of polymorphic crystalline structures can be identified by their X-ray diffraction patterns and are described in U.S. Patents 2,521,241–2, granted to Mitchell, September 5, 1950. The alpha-phase crystalline form is the least stable, least dense, and lowest melting of these crystalline forms.

Although it is not desired to be bound by an particular theory, it is believed that the film-forming tendency of the alpha-phase crystal-tending emulsifier promotes the incorporation of air during the preparation of a shortening-containing emulsion, such as a layer cake batter. The incorporation of air in a layer cake batter is achieved essentially by the production of a foam through an extension of the protein film. However, the oily phase of the batter normally tends to hinder the foam building properties of the protein. It is believed that the film-forming tendency of the alpha-phase crystal-tending emulsifier at the oil-aqueous phase interface prevents the oily phase from acting as a foam depressant toward the protein.

Among the alpha-phase crystal-tending emulsifiers that can be used in the practice of this invention are the following materials which are set forth by way of example only, and the invention is not to be limited to these specific alpha-phase crystal-tending emulsifiers: (a) Monoesters of straight chain aliphatic diols with saturated fatty acids, said diols containing from three to five carbon atoms and said saturated fatty acids containing from about 14 to about 22 carbon atoms; (b) a diglyceride as hereinafter fully described; and (c) a condensate of glycolic acid or lactic acid with a mixture of mono- and diglycerides.

(a) The foregoing straight chain diol alpha-phase crystal-tending emulsifiers include, by way of example: propylene glycol monostearate; 1,3-propanediol monostearate; 1,4-butanediol monostearate; 1,3-butanediol monostearate; 1,5-pentanediol monostearate; and the corresponding monoesters of the preceding-named diols with myristic acid, palmitic acid, arachidic acid, and behenic acid. The said diol monoesters can be prepared by direct esterification or interesterification of the diol by reaction with the desired fatty acid or a fatty ester of a monohydric or polyhydric alcohol under appropriate conditions of temperature, either with or without catalyst and/or solvent. In the direct reactions between fatty acid and diol, the reactants are normally mixed in ratios of one mole of fatty acid to .75 or more moles of diol. The yield of monoester is enhanced by using solvents such as dimethylformamide, dimethylacetamide, dimethylsulfoxide, xylene, or toluene; and catalysts such as p-toluene sulfonic acid, sulfuric acid, hydrogen chloride, or zinc chloride and other acidic or salt types are particularly effective in accelerating the rate of esterification.

Interesterification of the diol with fatty esters of alcohols such as methanol, ethanol, and propanol as well as fatty esters of polyhydric alcohols such as glycol, propylene glycol, 1,3-propanediol, 1,4-butanediol, glycerol, erythritol, ribitol, sorbitol, mannitol, and others is a particularly good path to the diol monoesters. Mutual solvents are of good value including such solvents as dimethylformamide, dimethylacetamide, dimethylsulfoxide, dioxane, pyridine, xylene, and toluene. Catalysts of greatest value are such catalysts as sodium methoxide, benzyl trimethyl ammonium methoxide, sodium hydroxide and others described by Eckey, U.S. Patent 2,442,532, at column 24, line 18 et seq.

The reaction products produced by interesterification and containing diol monoester can be recovered by inactivation of the catalyst with an appropriate acid such as acetic or phosphoric acid. The reaction products can be freed of solvents by distillation and used as prepared, or they can be purified by water washing and crystallization techniques to further enrich the diol monoester content. Crystallization from an aliphatic hydrocarbon solvent such as hexane is particularly effective in enriching the monoester in the crystalline phase. Solvent partition methods are also highly effective in concentrating the diol monoesters.

The preferred alpha-phase crystal-tending emulsifier of the straight chain diols is propylene glycol monostearate.

(b) The diglyceride alpha-phase crystal-tending emulsifiers employed in this invention are of three types, (1) the 1,3-diglycerides in which one of the acyl groups comprises a carbon chain of from two to four carbon atoms while the other acyl group comprises a chain of from 16 to 22 carbon atoms, (2) the 1,2-diglyceride in which one of the acyl groups comprises a carbon chain of from 12 to 18 carbon atoms and the other acyl group comprises a chain of from 16 to 22 carbon atoms, and (3) mixtures of the said 1,3-diglycerides and the isomeric 1,2-diglycerides which are formed during the preparation of the 1,3-diglycerides. The preparation of these isomeric mixtures is described hereinafter.

The 1,3-diglycerides can be prepared by: (1) partial acylation of a long chain monoglyceride with either the desired short chain acid, its acid chloride, or its acid anhydride under conditions known to those skilled in the art; (2) partial acylation of a short chain monoglyceride with either the desired long chain acid, its acid chloride, or its acid anhydride under conditions well known to those skilled in the art; and (3) interesterification of appropriate mixtures of long chain monoglycerides, diglycerides and/or triglycerides with short chain monoglycerides, diglycerides, and/or triglycerides, either with or without added glycerol under conditions such that the resulting reactant composition will contain approximately one equivalent of long-chain acyl component, one equivalent of short chain acyl component, and one mole of glycerol. This reaction is effectively catalyzed by basic catalysts such as sodium methoxide, quaternary ammonium bases and other catalysts such as those taught by Eckey, U.S. Patent 2,442,532, at column 24, line 18 et seq.

The crude reaction products containing substantial amounts of the desired 1,3-diglycerides can be used as prepared or the desired diglyceride component can be concentrated by application of appropriate methods of fractionation such as molecular distillation, fractional crystallization, and/or solvent partition. The crude 1,3-diglyceride reaction products which are used can contain the isomeric 1,2-diglyceride which is formed during the preparation of the 1,3-diglyceride.

The 1,2-diglycerides can be obtained by several routes. (1) They are the relatively low melting component of superglycerinated, hydrogenated fats and can be isolated by crystallization fractionation. Crystallization fractionation of a superglycerinated hydrogenated soybean oil in an aliphatic hydrocarbon solvent such as hexane leads to isolation of 1,2-distearin in a 15% yield in a purity of from about 80% to 90%. (2) Thermal isomerization by the method of A. Crossley et al., J. Chem. Soc., p. 700 (1959) of a pure 1,3-diglyceride prepared by the method of U.S. Patent 2,626,952, Lange and Baur, leads to an equilibrium mixture with 1,2-diglycerides, such as an acid or base catalyzed isomerization, are equally as advantageous to the preparation of 1,2-diglycerides, yielding mixtures which may be fractionated by crystallization. (4) Specific synthesis may be accomplished by partial acylation of a 2-monoglyceride to yield a mixture of 2-monoglyceride, 1-acyl-2-monoglyceride and 1,3-diacyl-2-monoglyceride. The 1-acyl-2-monoglyceride is separable from this product by fractional crystallization as the desired 1,2-diglyceride. (5) Specific synthesis may also be accomplished by diacylation of a glycerol derivative blocked at a primary hydroxy position. The blocking group is eliminated in a manner such as to yield the diacylated glycerol with the acyl groups in the 1,2-position. Glycerol derivatives amenable to this type of synthesis include 1-triphenylmethyl glycerol ether, 1-benzyl glycerol ether, and 1-tetrahydropyranyl glycerol ether. The triphenyl methyl and benzyl groups are removed by hydrogenolysis and the tetrahydropyranyl group is removed by boration with boric acid or alkoxy boric acids followed by aqueous hydrolysis of the borate intermediate.

Thus, the useful diglyceride alpha-phase crystal-tending emulsifiers include (1) 1,3-diglycerides containing a saturated fatty acid chain containing 16 to 22 carbon atoms and a saturated fatty acid chain containing from two to four carbon atoms; (2) 1,2-diglycerides containing a saturated fatty acid chain containing 16 to 22 carbon atoms and a saturated fatty acid chain containing from 12 to 18 carbon atoms; and (3) mixtures of the said 1,3-diglycerides and 1,2-diglyceride containing a saturated fatty acid containing 16 to 22 carbon atoms and a saturated fatty acid chain containing from two to four carbon atoms in which the weight of the 1,2-diglyceride does not substantially exceed the weight of the 1,3-diglyceride.

(c) The alpha-phase crystal-tending emulsifiers which are condensation products of glycolic acid or lactic acid can be prepared by interesterifying glycolic or lactic acid and mono- and diglycerides under partial vacuum and elevated temperatures of approximately 300° F. They may also be prepared by reacting glycerine, fatty acid, and glycolic or lactic acid. An example of a method of preparation is U.S. Patent 2,690,971. The mono- or diglycerides in the condensation product contain saturated fatty acid radicals containing 14 to 22 carbon atoms. The reactions to form the condensation product are on the basis of about a mole of glycolic acid or lactic acid with a mole of mono- and diglycerides mixed in ratios of from 1:9 to about 9:1. Mixtures of these emulsifiers can also be used.

The high temperature batter stabilizers of this invention are materials which are employed in the cake batter system which facilitate the retention of gas in the batter in the form of small bubbles until the cake is baked and minimize shrinkage during and subsequent to baking the cake.

Among the high temperature batter stabilizers which can be used in the practice of this invention are the following classes of materials which are set forth by way of example, but the invention is not to be limited to these specific high temperature batter stabilizers:

(a) The saturated fatty acids containing from about 14 to about 22 carbon atoms;

(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from about three to six carbon atoms and having from zero to four hydroxy groups, said condensation product having at least one free carboxyl group per molecule;

(c) The condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;

(d) The condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;

(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) The hydrogenated vegetable phosphatides having iodine values of less than about 30; and (g) The hydroxylated vegetable phosphatides.

The above classes of high temperature batter stabilizers are illustrated in further detail, including typical methods of preparation, in the description that follows. For example, the saturated fatty acids which can be employed in this invention include: myristic, palmitic, stearic, arachidic and behenic acids. These "long chain" fatty acids can be readily obtained from hydrogenated glycerides by saponification, acidulation, and isolation procedures. The fatty acid derived determines the choice of glyceridic material used. Thus, a technical grade of stearic acid can be obtained from highly hydrogenated soybean oil and a technical grade of behenic acid can be obtained from highly hydrogenated rapeseed oil.

Specific condensation products of partial fatty acid glycerides or diol monoesters with polycarboxylic acids which can be used as high temperature batter stabilizers in the practice of this invention include the condensation product of malic, tartaric, citric, citramalic, trihydroxy glutaric, mucic, saccharic, mannosaccharic, malonic, succinic, glutaric, methyl succinic, dimethyl succinic, adipic, tricarballylic, maleic, fumaric, itaconic, mesaconic, citraconic or aconitic acid with a monoglyceride, a diglyceride, or a mixture of mono- and diglycerides containing fatty acid radicals of the preceding named "long-chain" fatty acids, and if desired, unsaturated straight chain fatty acid radicals having from about 14 to about 22 carbon atoms in sufficient quantities to raise the iodine value of the condensation product not higher than 60, or with a monoester of propylene glycol, 1,3-propanediol, 1,4-butanediol, 1,3-butanediol, or 1,5-pentanediol with any of the preceding named "long-chain" fatty acids.

The condensation products of partial fatty acid glycerides or diol monoesters with polycarboxylic acids can be obtained by direct esterification. This reaction is advantageously carried out in a mutual solvent such as dimethyl formamide, dimethylacetamide, dioxane, xylene, and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants and impurities. These condensation products should contain one or more unesterified carboxyl groups per molecule.

Among the condensation products of fatty acids and hydroxy polycarboxylic acids which can be used in the practice of this invention, are the condensation products of the above-mentioned "long-chain" fatty acids with malic, tartaric, citric, citramalic, trihydroxy glutaric, mucic, saccharic, and mannosaccharic acids.

The high temperature batter stabilizer condensation products of fatty acids and hydroxypolycarboxylic acids preferably are prepared by acylating the hydroxy polycarboxylic acid with fatty acid chlorides by reaction in appropriate solvents such as pyridine, quinoline, dioxane, dimethylformamide, dimethylacetamide and mixtures thereof, either with or without addition of lipid solvents such as chloroform, benzene, and ethyl ether. These reactions can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method described in U.S. Patent 2,251,695, granted to Tucker, August 5, 1941, is an effective example of such a procedure. The condensation product obtained by this method should contain at least one free carboxyl group per molecule.

The condensation products of fatty alcohols and dicarboxylic acids which form suitable high temperature batter stabilizers include the condensation products of succinic, methyl succinic, dimethyl succinic, glutaric, malonic, adipic, maleic, or fumaric acids with saturated "long-chain" fatty alcohols containing from about 14 to about 22 carbon atoms such as myristyl, cetyl, stearyl, arachidyl, and behenyl alcohols. These condensation products also should contain one free carboxyl group per molecule and can be prepared by the same procedures used to prepare the condensation products of the partial fatty acid glycerides or diol monoesters with polycarboxylic acids, using the appropriate dicarboxylic acid and fatty alcohol.

Examples of condensation products of partial fatty acid glycerides and monoesters of polycarboxylic acids which can be used as high temperature batter stabilizers in the practice of this invention are the condensation products of the above-mentioned mono- and/or diglycerides of the "long-chain" fatty acids with monoesters of malic, tartaric, citric, citramalic, trihydroxy glutaric, mucic, saccharic, mannosaccharic, malonic, succinic, glutaric, methyl succinic, dimethyl succinic, adipic, tricarballylic, fumaric, itaconic, mesaconic, citraconic, or aconitic acid, with any of the preceding named "long-chain" fatty alcohols. A particularly desirable product of the class is stearyl monoglyceridyl citrate. These condensation products preferably are prepared by reacting the polycarboxylic acid with a mixture of the alcohols and a mixture of the mono- and diglycerides at elevated temperatures, for example, 150° C. to 165° C., in an inert atmosphere and under conditions where steam is removed.

The hydrogenated vegetable phosphatide which can be used as a high temperature batter stabilizer in the practice of this invention is an ordinary vegetable phosphatide, such as soya or corn lecithin which has been substantially hydrogenated to an iodine value of less than about 30 and preferably to less than about 15. The hydrogenation can be conducted by various means, e.g., such as contacting the phosphatide with hydrogen in the presence of a catalyst with or without solvents at elevated temperatures and pressures. Examples of suitable methods of hydrogenation are described in U.S. Patent 2,870,179, granted to Jacini, January 20, 1959; U.S. Patent 2,907,777, granted to Cole, October 6, 1959; and U.S. Patent 3,026,341, granted to Davis, March 20, 1962.

An example of a vegetable phosphatide which can be used in the practice of this invention is commercial lecithin which has been hydrogenated to an iodine value of about 15. Commercial lecithin is derived principally from soybeans and is a crude phosphatide material which generally contains on the order of about 60% to 70% phosphatides and about 30% to 40% oil. This crude material contains not only lecithin, but also associated phosphatides such as cephalin and inositide. The commercial lecithins as well as the pure phosphatide compounds, such as lecithin, can be hydrogenated to form suitable materials for this invention.

Another treatment of vegetable phosphatide which can be carried out to form suitable high temperature batter stabilizers for the practice of this invention is hydroxylation. Hydroxylation can be carried out by means of known hydroxylating reagents such as potassium permanganate and peracetic acid. Suitable methods of preparation are described in U.S. Patent 2,445,948, granted to Wittcoff, July 27, 1948. The hydroxylation will reduce the degree of unsaturation of the phosphatide such that the iodine value will be decreased by about 10 to about 50 units.

As an example of a suitable hydroxylated vegetable phosphatide, a commercial soy lecithin originally composed of about 65% phosphatide and 35% soybean oil can be hydroxylated to an iodine value of about 80. A suitable commercial hydroxylated lecithin is "Centrolene S."

Although specific methods of preparing the aforesaid alpha-phase crystal-tending emulsifiers and high temperature batter stabilizers have been described herein, it is not intended that the invention should be limited to any particular method of preparation of these materials.

The metals which can be used to form water-soluble polyvalent metal ion salts for use in this invention in combination with the above-mentioned alpha-phase crystal-tending emulsifiers, high temperature batter stabilizers, granular starch and soluble foamable protein include copper, magnesium, calcium, zinc, strontium, cadmium, barium, aluminum, titanium, tin, manganese, iron, cobalt and nickel. The non-toxic, water-soluble salts of these metals include compounds such, for example, as calcium chloride, magnesium chloride, magnesium bromide, magnesium iodide, magnesium idodate, stannous stearate, stannous chloride, polytitanyl stearate, aluminum sulfate, zinc, acetate, strontium tartrate, cupric gluconate, manganese succinate, nickel nitrate, cobalt chloride, sodium aluminum sulfate, and ferric manganese citrate. The invention is not limited to the foregoing illustrative salts. In selecting a suitable polyvalent metal ion salt it is important to choose one having an anion which forms a non-toxic salt with the polyvalent cation and one which is sufficiently soluble in water so that an effective amount of the salt of from about 0.001% to about 1.0% will be dissolved in the aqueous batter system.

The polyvalent cationic proteins such as protamines can also be used in combination with the alpha-phase crystal-tending emulsifier, high temperature batter stabilizers, granular starch and soluble foamable protein.

Although the precise mechanism by which the polyvalent cation operates to stabilize granular starch and soluble foamable protein-containing layer cake batter systems containing an alpha-phase crystal-tending emulsifier and a high temperature batter stabilizer is not completely understood, it is believed that the stabilization is effected by the formation of interfacial films in the layer cake batter consisting of surface active lipids and proteins fortified by chemical bonds between the negatively charged lipids (and proteins) and the positively charged polyvalent cations. Furthermore, it is believed that the interaction of the polyvalent cations with the layer cake batter system increases the hydrophobic character of the interfacial films. This prevents the migration of the interfacial film components into the aqueous phase which results in coalescence of the dispersed air and oil in the batter system. The coalescence of air and oil is due in part to the depletion (with increasing time) of the surface active materials from the interfacial films to a degree which causes instability of the colloidal system representing the cake batters.

In addition to the granular starch, the alpha-phase crystal-tending emulsifier, the high temperature batter stabilizer and the water-soluble polyvalent metal ion salts, it is essential that the granular starch layer cakes of this invention include a source of soluble foamable protein. Although the soluble foamable protein can be most practically provided by egg whites, it can be provided by any other protein material which is soluble and foamable, for example, partially hydrolyzed milk protein.

The shortenings which can be employed in the cake batter system of this invention include solid or plastic as well as liquid or semi-fluid glyceride shortenings derived from animal, vegetable or marine fats and oils, including synthetically prepared shortenings. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like, and are generally obtained from edible oils and fats such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from two to about six carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. The shortening can also contain minor amounts of conventional cake emulsifier such as the higher fatty acid mono- and diglycerides.

It is desirable to employ the shortening, granular starch, sugar, alpha-phase crystal-tending emulsifier, high temperature batter stabilizer, polyvalent metal ion salt and soluble foamable protein in connection with other cake ingredients in the form of a dry mix which can be packaged and marketed as a complete cake mix for convenient use by the consumer. These mixes are commonly referred to as "prepared layer cake mixes."

All types of granular starch prepared layer cake mixes and layer cake batters can be made with the products of this invention. White cakes, yellow cakes, chocolate cakes, devil's food cakes, marble cakes, spice cakes, high-ratio as well as low-ratio cakes, and many other layer cakes of excellent quality can be prepared simply by mixing the layer cake ingredients together in a single mixing step followed by baking. These layer cake mixes and batters can contain from about 20% to about 50% granular wheat starch. The low ratio layer cakes are those employing a low ratio of sugar to granular starch, usually on the order of about 1:1 by weight, as distinguished from the high ratio cakes which employ a substantially higher ratio of sugar to granular starch, such as up to about 1.3:1.

The present invention is not applicable to foam-type cakes of the conventional angel food variety which do not contain shortening or to other foam type cakes such as chiffon cake in which air is incorporated into a non-liquid-containing protein foam and which also contain an oil or plastic shortening but which do not require an alpha-phase crystal-tending emulsifier. Oil and plastic shortening markedly decrease air incorporation during agitation of soluble foamable protein solutions; hence, the basic difference between foam type cakes and layer cakes. The depressant effect of oil on protein foam is illustrated in the following test wherein 100 grams of egg white were first mixed vigorously to produce a foam. To four similar 100 gram batches of egg white, varying amounts of cottonseed oil (hereinafter referred to as CSO) and cottonseed oil containing 14% propylene glycol monostearate (hereinafter referred to as PGMS) were added prior to vigorous mixing. The densities of the resultant foams were measured. These results reported in Table I clearly demonstrate the depressant effect of an oil upon air incorporation in protein foam.

TABLE I

| Wt. Egg White (grams) | Wt. Liquid CSO (grams) | Whipping Time (min.) | Foam Density, (g./ml.) |
|---|---|---|---|
| 100 | -------- | 3.5 | 0.134 |
| 100 | 10 | 5 | 0.435 |
| 100 | a 83.5 | 5 | 0.640 |
| 100 | b 10 | 5 | 0.435 |
| 100 | b 83.5 | 5 | 0.435 | a Weight ratio of egg white:oil in a high ratio cake batter.
b 14% PGMS in cottonseed oil.

The following examples illustrate the present invention; however, this invention is not limited to these specific examples. All percentages are by weight unless otherwise specified.

*Example 1*

A standard white cake batter having the following composition was prepared in the manner indicated:

Parts by weight (grams)
Sifted cake flour _____ 190
Sugar _____ 267
Sodium chloride _____ 3
"Crisco" plastic shortening _____ 100
Milk _____ 160

The above ingredients were combined in a mixing bowl and mixed for two minutes in a Mixmaster at speed 5. 11.55 grams of double-acting baking powder (Calumet) were then added and mixing continued for about 30 seconds at speed 1. The following ingredients were then added individually:

Milk _____grams__ 80
Egg white _____do____ 120
Vanilla _____cc__ 5

After mixing for two minutes at speed 5, the batter was scaled out into two 400 gram layers, placed into 8-inch pans and baked at 365° F. for 25 minutes.

A similar batter was prepared except that 190 grams of granular wheat starch was used in place of the sifted wheat cake flour. The results reported below in Table II indicate that starch cannot be successfully used in a standard batter system.

TABLE II

| | Volume, cc./400 g. | Remarks |
|---|---|---|
| Standard white cake_____ | 1,100 | Typical cake structure. |
| Granular starch white cake____ | 840 | No cake structure; gelled starch mass. |

A similar white cake was prepared with 103 grams of granular wheat starch plus four grams of flour water solubles (2:1 water to flour extract, freeze dried) in place of the sifted wheat cake flour. A volume of 910 cc./400 grams was obtained. The product did not possess cake structure. Thus, the presence of a soluble foamable protein in a standard batter system wherein the conventional flour has been replaced by granular wheat starch does not produce a typical cake structure.

*Example 2*

A series of low ratio white layer cake batters was prepared in which granular wheat starch was employed in lieu of cake flour. Various plastic and liquid shortenings were used. Similar batters were also prepared except that 300 mg. of calcium chloride were added to the dry ingredients. The following basic cake formulation was employed:

|  | Percent | Parts by weight (grams) | Percent Dry Mix |
|---|---|---|---|
| Granular wheat starch |  | 121 | 40.10 |
| Powdered sugar (6X) |  | 122 | 40.40 |
| Shortening |  | 33 | 11.00 |
| Baking powder |  | 7.7 | 2.62 |
| Monocalcium phosphate | 20 |  |  |
| Sodium acid pyrophosphate | 21.4 |  |  |
| Sodium bicarbonate | 28.6 |  |  |
| Corn starch | 30.0 |  |  |
|  | 100.0 |  |  |
| Sodium chloride |  | 2.5 | 0.83 |
| Dextrose |  | 5.7 | 1.90 |
| Non-fat milk solids |  | 8.9 | 2.95 |
| Carboxymethyl cellulose |  | 0.3 | 0.10 |
| Flavor (vanilla) |  | 0.3 | 0.10 |
|  |  | 301.4 | 100.00 |

Each cake in the series was prepared in the following maner: The shortening was added to the powdered sugar at 60° C. and mixed in Hobart mixer until well dispersed. The remainder of the dry ingredients were blended together and then added to the shortening and sugar mixture. Mixing in the Hobart bowl was continued until a uniform mixture was achieved. The complete mix was then passed through a household type sieve to produce a dry mix. 284 grams of the dry mix were place in a 1-quart Sunbeam mixing bowl. With the mixer on low speed, 150 ml. of distilled water was added (from a dispensing burette) over a period of 75 seconds. Thirty grams of fresh egg white were then added and the mixing speed increased to 500 r.p.m. for a period of three minutes. 440 grams of batter were placed in an 8-inch pan and baked at 365° F. for 30 minutes.

The following Table III shows the hot and cold volumes obtained for five cakes in the series as well as the cake profile and cellular (grain) characteristics. In three of the cakes, no polyvalent metal salt was used. In the other two cakes, calcium chloride was added to the dry ingredients. The cake volumes in this and subsequent examples are stated in cc. per 440 grams of batter. The hot volumes (HV) were measured immediately after the baking period; the cold volumes (CV) were measured 20 minutes thereafter. An improvement in cake volume of more than 50 cc./440 g. batter is considered to be a significant improvement in volume. The cake profile grade describes the difference in height of the cake layer between the center and the edge of the cake. The positive and negative integers represent the number of millimeters higher and lower, respectively, by which the height of the center of the cake varies from the edge. For example, a cake profile of from −1 to −10 indicates an undesirable dip in the center of the cake of from 2 to 20 mm. On the other hand, a cake profile of from about +5 to about +15 indicates a suitable rise in the center of the cake from 10 to 30 mm. A cake profile substantially higher than +15 would be undesirable. The cellular grade or grain is a subjective measurement of the coarseness or fineness of cake texture. A grain value of from about 20 to about 25 is standard. Grain values ranging from about 30 to about 35 indicate very fine grain. In some cases, however, the fineness in texture may be due to shrinkage of the cake in volume. Grain values ranging from 15 to 20 indicate somewhat coarse grain, though not undesirable if the over-all cake volume and profile is satisfactory.

TABLE III

| Shortening | Batter Density | HV | CV | Profile | Grain |
|---|---|---|---|---|---|
| (a) 14% PGMS + 2% stearic acid in refined and bleached cottonseed oil | 0.64 |  | (1) |  |  |
| (b) same as (a) with 300 mg. CaCl₂ added | 0.77 | 1,460 | 1,405 | +14 | 28 |
| (c) 14% PGMS in "Primex" plastic shortening |  |  | (1) |  |  |
| (d) 14% PGMS + 2% stearic acid in "Primex" plastic shortening |  |  | (1) |  |  |
| (e) Same as (d) with 300 mg. CaCl₂ added |  | 1,330 | 1,275 | +10 | 27 |

¹ Failure.

The results reported in Table III clearly show the need for a polyvalent metal ion salt in a granular starch layer cake containing an alpha-phase crystal-tending emulsifier and a high temperature batter stabilizer.

*Example 3*

Two low-ratio granular starch white layer cake batters were prepared in the manner described in Example 2 with a liquid cottonseed oil shortening containing 14% PGMS and 2% stearic acid. In one of these two cakes sodium aluminum sulfate replaced the sodium acid pyrophosphate in the baking powder. The results reported in Table IV show the necessity for a soluble polyvalent metal ion salt.

TABLE IV

|  | Batter Density | HV | CV | Profile | Grain |
|---|---|---|---|---|---|
| Control cake without added Al₂(SO₄)₃·18H₂O | .61 | (1) | (1) |  |  |
| With Al₂(SO₄)₃·18H₂O | .75 | 1,595 | 1,515 | +16 | 26 |

¹ Failure.

*Example 4*

Three low ratio granular starch white layer cake batters were prepared in the manner described in Example 2 with a liquid cotton seed oil shortening containing 14% PGMS and 2% stearic acid except that various metal ion salts were added as dry ingredients in molar quantity equivalent to that of the added calcium chloride in Example 2. The results reported in Table V show the applicability of these polyvalent metal ion salts.

TABLE V

|  | HV | CV | Profile | Grain |
|---|---|---|---|---|
| Control cake without polyvalent metal ion salt | (1) | (1) |  |  |
| With ZnCl₂ | 1,680 | 1,585 | +18 | 30 |
| With CdCl₂ | 1,625 | 1,575 | +17 | 26 |

¹ Failure.

*Example 5*

Six low ratio granular starch white layer cake batters were prepared in the manner described in Example 2 which differed from each other in the type of shortening and alpha-phase crystal-tending emulsifier and high temperature batter stabilizer employed. All cakes contained 300 mg. of calcium chloride per layer. The results shown in Table VI illustrate the utility in low ratio granular starch white layer cakes of both liquid and plastic shortenings.

TABLE VI

| Shortening Base | Alpha-phase crystal-tending Additive | High Temperature Batter Stabilizer | CV | Profile | Grain |
|---|---|---|---|---|---|
| Refined and bleached cottonseed oil | 14% PGMS | 2% Stearic acid | 1,405 | +14 | 28 |
|  | 8% Glyceryl lacto stearate | 2% Stearoyl propylene glycol hydrogen succinate. | 1,185 |  |  |
|  | 14% Acetylated monoglycerides ("Myvacet 7-00"). | 2% Stearoyl propylene glycol hydrogen. | 1,075 | +7 | 15 |
| "Primex" plastic shortening | 8% Glyceryl lacto stearate | 2% Stearoyl propylene glycol hydrogen succinate. | 1,130 | +8 | 27 |
|  | 14% Acetylated monoglycerides ("Myvacet 7-00"). | 2% Stearoyl propylene glycol hydrogen succinate. | 1,145 | +6 | 21 |
|  | 14% Acetylated monoglycerides ("Myvacet 7-00"). | 1% Citric acid ester of mono- and diglyceride. | 1,000 | −3 | 15 |

*Example 6*

A series of low ratio granular starch white layer cake batters was prepared in the manner described in Example 2 which contained 300 mg. of calcium chloride per layer, a liquid shortening consisting of 14% PGMS and 2% stearic acid in cottonseed oil, and in which particular proteins served as the *sole* source of protein in the batter. These protein sources were added in amounts equivalent to the weight of protein contained in the fresh egg whites included in the basic formulation given in Example 2. In each instance, this was taken to be 10% of the egg white by weight. An additional quantity of water (equal to 90% of the fresh egg white weight) was also added. The following results show the need for soluble foamable proteins in starch layer cakes.

| Protein Source | Remarks | CV |
|---|---|---|
| No protein | | Failure. |
| Egg white | Soluble, foamable | 1,185. |
| Non-fat milk solids | Partially soluble, foamable | 1,390. |
| Cake flour water solubles | Foamable | 950. |
| Soybean protein | Insoluble | Failure. |
| Fish protein (haddock) | Soluble fraction | 1,240. |
| Partially hydrolyzed milk protein. | Soluble, foamable | 1,625. |
| Severely hydrolyzed soybean protein. | Soluble, not foamable | Failure. |

When calcium chloride was not included in the granular starch white layer cake batter, each of the above layer cakes failed.

*Example 7*

A fluid shortening was prepared by mixing together with slight warming the following materials in the stated amounts:

Percent by weight
Refined and bleached cottonseed oil _____ 85.5
Propylene glycol stearate (approximately ½ each mono- and diesters) _____ 14.0
Stearic acid _____ 0.5

The fluid shortening was used to prepare a high ratio granular starch white layer cake consisting of the following ingredients:

Parts by weight (grams)
Granular wheat starch _____ 95.0
Granulated sugar _____ 133.0
Shortening _____ 47.5
Baking powder:
  Monocalcium phosphate _____ 20%
  Sodium acid pyrophosphate _____ 21.4%
  Sodium bicarbonate _____ 28.6%
  Corn starch _____ 30%
Sodium chloride _____ 2.5
Whole milk _____ 130.0
Fresh egg whites _____ 60.0
Flavor (vanilla) _____ 2.0 ml.

The above ingredients plus 300 mg. of dry calcium chloride were mixed in a small bowl for four minutes with a Sunbeam mixer at speed 5½ (450–500 r.p.m.). Batter temperature and batter density were obtained immediately after mixing. An 8-inch pan was scaled with 400 grams of batter and baked for 25 minutes at 365° F. Cake volumes were determined immediately upon removal from the oven (HV) and 20 minutes later (CV). Cake grain structure and contour were determined on the following day. A cold volume of 1340 cc./400 g. was obtained with a profile of +12 and a grain of 26.

A similar batter system was prepared in which the calcium chloride was replaced with sodium aluminum sulfate as a constituent of double-acting baking powder (Calumet). The resultant cake had a cold volume of 1750 cc./400 g. Sodium aluminum sulfate is a source of polyvalent metal ions and can be replaced by sodium acid pyrophosphate and calcium chloride. Other sources of polyvalent metal ions such as calcium acetate, calcium nitrate, barium chloride, copper nitrate and stannous chloride give similar results when used with sodium acid pyrophosphate as does calcium chloride.

*Example 8*

Six high ratio granular starch white layer cakes were prepared according to the method of Example 7 with sodium aluminum sulfate as the source of metal ion. The shortening was composed of 14% propylene glycol monostearate in cottonseed oil plus 0.5% of the various high temperature batter stabilizers enumerated in Table VII. The hot and cold volumes obtained demonstrate the utility of these additives in high ratio granular starch white layer cakes.

TABLE VII

| High temperature batter stabilizer (0.5%) | HV | CV |
|---|---|---|
| Stearic acid | 2,070 | 1,950 |
| Malic stearate | 1,550 | 1,330 |
| Citric acid ester of mono- and diglyceride | 1,490 | 1,425 |
| Stearoyl propylene glycol hydrogen succinate | 1,750 | 1,605 |
| Stearoyl propylene glycol hydrogen adipate | 1,295 | 1,190 |

*Example 9*

A high ratio granular starch yellow layer cake and a high ratio granular starch chocolate layer cake were prepared according to the following recipes:

Parts by weight (grams)
Yellow:
  Granular wheat starch _____ 96
  Granulated sugar _____ 133
  Sodium chloride _____ 2.5
  Double-acting baking powder (Calumet) _ 6.7
  Whole milk _____ 130.0
  Whole egg _____ 48.0
  Shortening _____ 47.5
  Vanilla _____ 2.5 cc.

Mix ingredients for four minutes at 450–500 r.p.m. Scale 400 grams into an 8-inch pan and bake for 25–30 minutes at 365° F.

| Chocolate: | Parts by weight (grams) |
|---|---|
| Granular wheat starch | 85 |
| Granulated sugar | 125 |
| Sodium chloride | 1.5 |
| Baking soda | 4.0 |
| Double-acting baking powder (Calumet) | 4.0 |
| Melted Baker's chocolate | 1 square |
| Shortening | 47.5 |
| Whole milk | 120 |
| Whole egg | 48 |
| Vanilla | 2.5 cc. |

Mix ingredients for four minutes at 450–500 r.p.m. Scale 400 grams into an 8-inch pan and bake for 25–30 minutes at 365° F.

A plastic shortening "Primex" containing 14% propylene glycol monostearate and 0.5% stearic acid was used to prepare the above cakes. In each instance, metal ion was present in the baking powder as sodium aluminum sulfate. The yellow cake had a cold volume of 1800 cc./400 g. and a good profile and good grain. The volume of the cholocate cake was 1640 cc./400 g. The chocolate cake had a good profile and a good grain.

*Example 10*

A series of high ratio granular starch white layer cakes was prepared in the manner described in Example 7 except that various single granular starches or mixtures of granular starches were used in place of the granular wheat starch. The shortening was the same as that prepared and used in Example 7. The results of this series are reported in Table VIII.

TABLE VIII

| Starch | CV | Remarks |
|---|---|---|
| Wheat | 1,750 | Slightly dry eating quality. |
| Corn | 1,280 | Shrinks on cooling. |
| Potato | 1,040 | Sets early. |
| Rice | 1,150 | Shrinks on cooling. |
| Arrowroot | 1,130 | Do. |
| Waxy rice | 965 | Do. |
| 60/40 wheat/rice | 1,750 | Moist eating quality. |
| 90/10 wheat/amioca | 1,605 | Eating quality improves with increasing level of amioca. |
| 80/20 wheat/amioca | 1,700 | |
| 60/40 wheat/amioca | 1,585 | |
| 80/20 wheat/phosphorylated cornstarch. | 1,730 | |
| 60/40 wheat/phosphorylated cornstarch. | 1,515 | |

*Example 11*

Another series of high ratio granular starch white layer cakes was prepared in the manner described in Example 7 except that various isolated starch fractions and mixtures of isolated starch fractions were used in place of granular starch. The shortening was the same as that prepared and used in Example 7. The results of this series are reported in Table IX.

TABLE IX

| Starch Fraction | CV | Remarks |
|---|---|---|
| Amylopectin | | No product. Batter was a dough. |
| 95/5 amylopectin/amylose | | Do. |
| 80/20 amylopectin/amylose | | Do. |
| Amylose | | Very thick batter. No cake. |

This particular series indicates the necessity for granular starches since isolated starch fractions and mixtures thereof do not allow cake formation. An 80/20 amylopectin-amylose mixture which is equivalent in composition but not in physical form to granular wheat starch will not form a cake. Mixtures of granular starch with isolated starch fractions do allow cake formation; for example, a layer cake prepared in the manner described in Example 7 with a 90/10 granular starch/amylose mixture produces a stable layer cake having a hot volume of 1800 cc./400 g. and a cold volume of 1660 cc./400 g. Other ratios of granular starch to amylose or amylopectin can be used to form stable cake structures.

Mixtures of granular starches with flour can also be used to prepare starch-containing layer cakes of the kind and variety illustrated in the preceding examples. To have improved volume and grain over conventional flour-containing makes, such cakes must include an alpha-phase crystal-tending emulsifier, a high temperature batter stabilizer, a polyvalent metal ion salt and a soluble foamable protein. Layer cakes having the volume and grain of granular starch layer cakes can also be obtained by using solvent extracted flour either alone or in combination with granular starch or regular flour when the batter also contains an alpha-phase crystal-tending emulsifier, a high temperature batter stabilizer, a polyvalent metal ion salt and a soluble foamable protein.

Other oil-based shortenings such as soybean oil-based shortenings can be substituted for the cottonseed oil-based shortenings in the above examples and substantially the same results obtained.

What is claimed is:

1. A process for improving a layer cake batter system consisting essentially of granular starch, water, shortening and sugar, which comprises incorporating in the batter emulsion from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, from about 0.001% to about 1.0%, by weight of the batter emulsion, of a non-toxic, water-soluble polyvalent metal ion salt, and from about 0.5% to about 8.0%, by weight of the batter emulsion, of a soluble foamable protein.

2. The process of claim 1 in which the granular starch is granular wheat starch.

3. The process of claim 1 in which the alpha-phase crystal-tending emulsifier is selected from the group consisting of (a) monoesters of straight chain aliphatic diols with saturated fatty acids, said diols containing from 3 to 5 carbon atoms and said saturated fatty acids containing from about 14 to about 22 carbon atoms; (b) 1,3-diglycerides containing a saturated fatty acid containing 16 to 22 carbon atoms and a saturated fatty acid containing from 2 to 4 carbon atoms; (c) 1,2-diglycerides containing a saturated fatty acid containing 16 to 22 carbon atoms and a saturated fatty acid containing 12 to 18 carbon atoms; (d) mixtures of (b) and 1,2-diglycerides containing a saturated fatty acid containing 16 to 22 carbon atoms and a saturated fatty acid containing from 2 to 4 carbon atoms in which the weight of the 1,2-diglyceride does not substantially exceed the weight of (b); (e) the condensation product of glycolic acid with a mixture of fatty mono- and diglycerides in ratios of from about 1:9 to about 9:1, said fatty acid mono- and diglycerides having fatty acid radicals containing from 14 to 22 carbon atoms; and (f) the condensation product of lactic acid with a mixture of fatty mono- and diglycerides in ratios of from about 1:9 to about 9:1, said fatty acid mono- and diglycerides having fatty acid radicals containing from 14 to 22 carbon atoms.

4. The process of claim 1 in which the alpha-phase crystal-tending emulsifier is propylene glycol monostearate.

5. The process of claim 1 in which the high temperature batter stabilizer is selected from the group consisting of (a) The saturated fatty acids containing from about 14 to about 22 carbon atoms;

17

(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon toms and having from zero to four hydroxy groups, said condensation product having at least one free carboxyl group per molecule;

(c) The condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;

(d) The condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;

(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) The hydrogenated vegetable phosphatides having iodine values of less than about 30; and (g) The hydroxylated vegetable phosphatides.

6. The process of claim 1 in which the polyvalent metal ion is derived from salts selected from tthe group consisting of the non-toxic, water-soluble salts of copper, magnesium, calcium, zinc, strontium, cadmium, barium, aluminum, titanium, tin, manganese, iron, cobalt, and nickel.

7. The process of claim 1 in which the soluble foamable protein is partially hydrolyzed milk protein.

8. A layer cake batter system consisting essentially of granular starch, water, shortening, and sugar, and from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, from about 0.001% to about 1.0%, by weight of the batter emulsion, of a non-toxic, water-soluble polyvalent metal ion salt, and from about 0.5% to about 8.0%, by weight of the batter emulsion, of a soluble foamable protein.

9. The layer cake batter system of claim 8 in which the granular starch is granular wheat starch.

10. The layer cake batter system of claim 8 in which the alpha-phase crystal-tending emulsifier is selected from the group consisting of (a) monoesters of straight chain aliphatic diols with saturated fatty acids, said diols containing from 3 to 5 carbon atoms and said saturated fatty acids containing from about 14 to about 22 carbon atoms; (b) 1,3-diglycerides containing a saturated fatty acid containing 16 to 22 carbon atoms and a saturated fatty acid containing from 2 to 4 carbon atoms; (c) 1,2-diglycerides containing a saturated fatty acid containing 16 to 22 carbon atoms and a saturated fatty acid containing 12 to 18 carbon atoms; (d) mixtures of (b) and 1,2-diglycerides containing a saturated fatty acid containing 16 to 22 carbon atoms and a saturated fatty acid containing from 2 to 4 carbon atoms in which the weight of the 1,2-diglyceride does not substantially exceed the weight of (b); (e) the condensation product of glycolic acid with a mixture of fatty mono- and diglycerides in ratios of from about 1:9 to about 9:1, said fatty acid mono- and diglycerides having fatty acid radicals containing from 14 to 22 carbon atoms; and (f) the condensation product of lactic acid with a mixture of fatty mono- and diglycerides in ratios of from about 1:9 to about 9:1, said fatty acid mono- and diglycerides having fatty acid radicals containing from 14 to 22 carbon atoms.

11. The layer cake batter system of claim 8 in which the alpha-phase crystal-tending emulsifier is propylene glycol monostearate.

12. The layer cake batter system of claim 8 in which the high temperature batter stabilizer is selected from the group consisting of (a) The saturated fatty acids containing from about 14 to about 22 carbon atoms;

(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon atoms and having from zero to four hydroxy groups, said condensation product having at least one free carboxyl group per molecule;

(c) The condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;

(d) The condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;

(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) The hydrogenated vegetable phosphatides having iodine values of less than about 30; and (g) The hydroxylated vegetable phosphatides.

13. The layer cake batter system of claim 8 in which the polyvalent metal ion is derived from salts selected from the group consisting of the non-toxic, water-soluble salts of copper, magnesium, calcium, zinc, strontium, cadmium, barium, aluminum, titanium, tin, manganeses, iron, cobalt, and nickel.

14. The layer cake batter system of claim 8 in which the soluble foamable protein is partially hydrolyzed milk protein.

15. A dry layer cake mix consisting essentially of granular starch, shortening and sugar and from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, from about 0.001% to about 1.0%, by weight of the batter emulsion, of a non-toxic water-soluble polyvalent metal ion salt, and from about 0.5% to about 8.0%, by weight of the batter emulsion, of a soluble foamable protein.

16. The dry layer cake mix of claim 15 in which the granular starch is granular wheat starch.

17. The dry layer cake mix of claim 15 in which the alpha-phase crystal-tending emulsifier is selected from the group consisting of (a) monoesters of straight chain aliphatic diols with saturated fatty acids, said diols containing from 3 to 5 carbon atoms and said saturated fatty acids containing from about 14 to about 22 carbon atoms; (b) 1,3-diglycerides containing a saturated fatty acid containing 16 to 22 carbon atoms and a saturated fatty acid containing from 2 to 4 carbon atoms; (c) 1,2-diglycerides containing a saturated fatty acid containing 16 to 22 carbon atoms and a saturated fatty acid containing 12 to 18 carbon atoms; (d) mixtures of (b) and 1,2-diglycerides containing a saturated fatty acid containing 16 to 22 carbon atoms and a saturated fatty acid containing from 2 to 4 carbon atoms in which the weight of the 1,2-diglyceride does not substantially exceed the weight of (b); (e) the condensation product of glycolic acid with a mixture of fatty mono- and diglycerides in ratios of from about 1:9 to about 9:1, said fatty acid mono- and diglycerides having fatty acid radicals containing from 14 to 22 carbon atoms; and (f) the condensation product of lactic acid with a mixture of fatty mono- and diglycerides in ratios of from about 1:9 to about 9:1, said fatty acid mono- and diglycerides having fatty acid radicals containing from 14 to 22 carbon atoms.

18. The dry layer cake mix of claim 15 in which the alpha-phase crystal-tending emulsifier is propylene glycol monostearate.

19. The dry cake mix of claim 15 in which the high temperature batter stabilizer is selected from the group consisting of
(a) The saturated fatty acids containing from about 14 to about 22 carbon atoms;
(b) The condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon atoms and having from zero to four hydroxy groups, said condensation product having at least one free carboxyl group per molecule;
(c) The condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;
(d) The condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;
(e) The condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;
(f) The hydrogenated vegetable phosphatides having iodine values of less than about 30; and
(g) The hydroxylated vegetable phosphatides.

20. The dry layer cake mix of claim 15 in which the polyvalent metal ion is derived from salts selected from the group consisting of the non-toxic, water-soluble salts of copper, magnesium, calcium, zinc, strontium, cadmium, barium, aluminum, titanium, tin, manganese, iron, cobalt, and nickel.

21. The dry layer mix of claim 15 in which the soluble foamable protein is partially hydrolyzed milk protein.

References Cited by the Examiner

UNITED STATES PATENTS

| | | | |
|---|---|---|---|
| 3,145,107 | 8/1964 | Howard | 99—118 |
| 3,145,108 | 8/1964 | Howard | 99—118 |
| 3,145,109 | 8/1964 | Howard | 99—118 |

A. LOUIS MONACELL, *Primary Examiner.*

RAYMOND N. JONES, *Assistant Examiner.*